United States Patent
Kuricheti et al.

(10) Patent No.: US 12,001,318 B2
(45) Date of Patent: Jun. 4, 2024

(54) SELF SUSTAINED REGRESSION TESTING FRAMEWORK

(71) Applicant: PayPal, Inc., San Jose, CA (US)

(72) Inventors: Prasanth Kuricheti, San Jose, CA (US); Jogendar Singh, Fremont, CA (US); Rajesh Kumar, San Jose, CA (US); Xinran Fang, Mountain View, CA (US); Naresh Kumar Paturi, San Jose, CA (US); Durjay Kumar Mishra, San Jose, CA (US); Anil Kumar Kandru, Sunnyvale, CA (US); Venkata Siva Sai Manepalli, Austin, TX (US)

(73) Assignee: PayPal, Inc., San Jose, CA (US)

( * ) Notice: Subject to any disclaimer, the term of this patent is extended or adjusted under 35 U.S.C. 154(b) by 148 days.

(21) Appl. No.: 16/237,108

(22) Filed: Dec. 31, 2018

(65) Prior Publication Data
US 2020/0210323 A1 Jul. 2, 2020

(51) Int. Cl.
*G06F 11/36* (2006.01)
*H04L 9/32* (2006.01)

(52) U.S. Cl.
CPC ...... *G06F 11/3664* (2013.01); *G06F 11/3688* (2013.01); *G06F 11/3696* (2013.01); *H04L 9/3236* (2013.01)

(58) Field of Classification Search
CPC ............. G06F 11/3664; G06F 11/3688; G06F 11/3696; H04L 9/3236
See application file for complete search history.

(56) References Cited

U.S. PATENT DOCUMENTS

| | | | | |
|---|---|---|---|---|
| 8,751,450 B1 * | 6/2014 | Gaonkar | ................. | G06F 21/00 707/634 |
| 8,914,675 B2 * | 12/2014 | Hatano | ................. | G06F 11/263 714/32 |
| 10,394,700 B1 * | 8/2019 | Unsal | ................. | G06F 11/3676 |
| 10,474,563 B1 * | 11/2019 | Rai | ................. | G06F 11/3672 |
| 10,587,491 B1 * | 3/2020 | Volpe | ................. | H04L 43/10 |
| 2018/0349254 A1 * | 12/2018 | Hui | ................. | G06F 11/3664 |

\* cited by examiner

*Primary Examiner* — S. Sough
*Assistant Examiner* — Mohammad H Kabir
(74) *Attorney, Agent, or Firm* — Haynes and Boone, LLP (57) ABSTRACT

Systems, methods, and computer program products for testing new software are provided. Multiple payloads that correspond to scenarios in a production computing environment are identified. From the multiple payloads unique payloads are identified. User data that corresponds to the unique payloads is created. A first testing environment conducts a test using software components in the production environment, the unique payloads, and the user data to generate expected results. A second testing environment conducts a test using new software that replaces at least one of the software components in the production environment, the unique payloads, and the user data, to generate actual results. The one or more attributes in the expected results are compared to the one or more attributes in the actual results to determine if the new software causes an error.

20 Claims, 4 Drawing Sheets

SELF SUSTAINED REGRESSION TESTING FRAMEWORK

TECHNICAL FIELD

The disclosure generally relates to techniques for testing new software in a testing framework.

BACKGROUND

A testing system may be designed to test new software (including new versions of existing software) before the new software is released into production environment. However, once the new software is released into the production environment, the new software may still generate errors because a scenario that exists in a production environment may not exist in a testing environment, and therefore the new software may not have been tested by the testing system using the scenario. The new software may also generate errors in the production environment because the new software may not have been tested with other components in the production environment to determine how the new software affects the other components.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

New software or an upgrade to existing software (collectively referred to as new software) may be released into a production environment on a weekly or monthly basis. Although the new software may be unit tested in a testing environment, errors from the new software on the entire production environment may be more difficult to detect. When the new software causes an error in the production environment, the error may be critical to the service provider and should be resolved quickly. Often the causes for the error may be resolved by testing the new software with other software components that exist in the production environment. Additionally, the lack of understanding of how different software components act on the data included in the scenarios may also contribute to causes that result in an error. Another cause for an error may occur when scenarios in a testing environment are configured by a developer or an engineer. These scenarios, however, may not encompass all scenarios that exist in the production environment. Accordingly, once the new software is released into the production environment, the new software may encounter the previously untested scenarios and generate an error.

One way to eliminate or reduce the errors in the production environment is to find a way that identifies unique scenarios from the scenarios that occur in the production environment and use the unique scenarios to test the new software in the testing environment. In some embodiments, to identify unique scenarios, a payload processor may be installed in the production environment. The payload processor may receive scenarios that occur in the production environment and generate payloads from the scenarios. Each payload may include a host or a computing device that processes the scenario, a type of a scenario, one or more requests and responses that occurred in the scenario, decisions that the host or an application made during the scenario, etc.

In an embodiment, because the payload processor may receive millions of payloads an hour from various components in the production environment, the payload processor may pass the payloads to a unique payload identification module, which may be the same or different component from the payload processor. The unique payload identification module may also be one of the components in a testing system that may be used to test the new software. The unique payload identification module may identify unique payloads from the millions of payloads obtained by the payload processor and reduce the millions of payloads to thousands (or less) of unique payloads, while preserving each unique scenario included in the millions of payloads. To identify the unique payloads, the unique payload identification module may use one or more attributes in each payload to generate a hash. The unique payload identification module may then aggregate the payloads that have the same hash into payload sets and select one payload from each payload set as the unique payload.

In an embodiment, the testing system may include a data modification module. The data modification module may modify the one or more attributes in the unique payloads. For example, because unique payloads may include data from the production environment that may be associated with real users, such as personal data, financial data, etc., the data modification module may modify or erase the user data, personal data, financial data, etc., from the unique payloads. The data modification module may store the modified unique payloads in a data storage.

In an embodiment, the data storage of the testing system may also include user data. The user data may include data associated with a user and user profiles that emulate the real user data generated in the production environment. The user data in the data storage, however, is not associated with the real-world users. In some embodiments, the testing system may generate user data that has one or more attributes used to test one or more unique payloads in the testing system.

In an embodiment, the testing system may use the unique payloads and the user data to test the new software. To test the new software, the testing environment may include a first testing environment that includes the software that has been uploaded to and is used in the production environment. The testing environment may also include a second testing environment that has new software that may be tested for errors before the new software is transferred into the production environment in addition to other software components that make up the production environment. The new software may be a new version of the software that is used by the production environment or a completely new software that is to be uploaded to the production environment for the first time. The testing system may pass some or all unique payloads and some or all user data through the first testing environment to generate the expected results and through the second testing environment to generate the actual results.

In an embodiment, once the first testing environment generated the expected results and the second testing environment generated actual results, a validation module in the testing system compares the expected results with the actual results to determine errors. For example, the validation module may determine whether the one or more attributes in the expected results match the one or more attributes in the actual results. In another example, the validation module may determine whether one or more attributes in the actual results have changed with respect to the one or more attributes in the expected results to determine that there is no error in the new software.

Further embodiments of the disclosure are discussed below.

Figure 1:
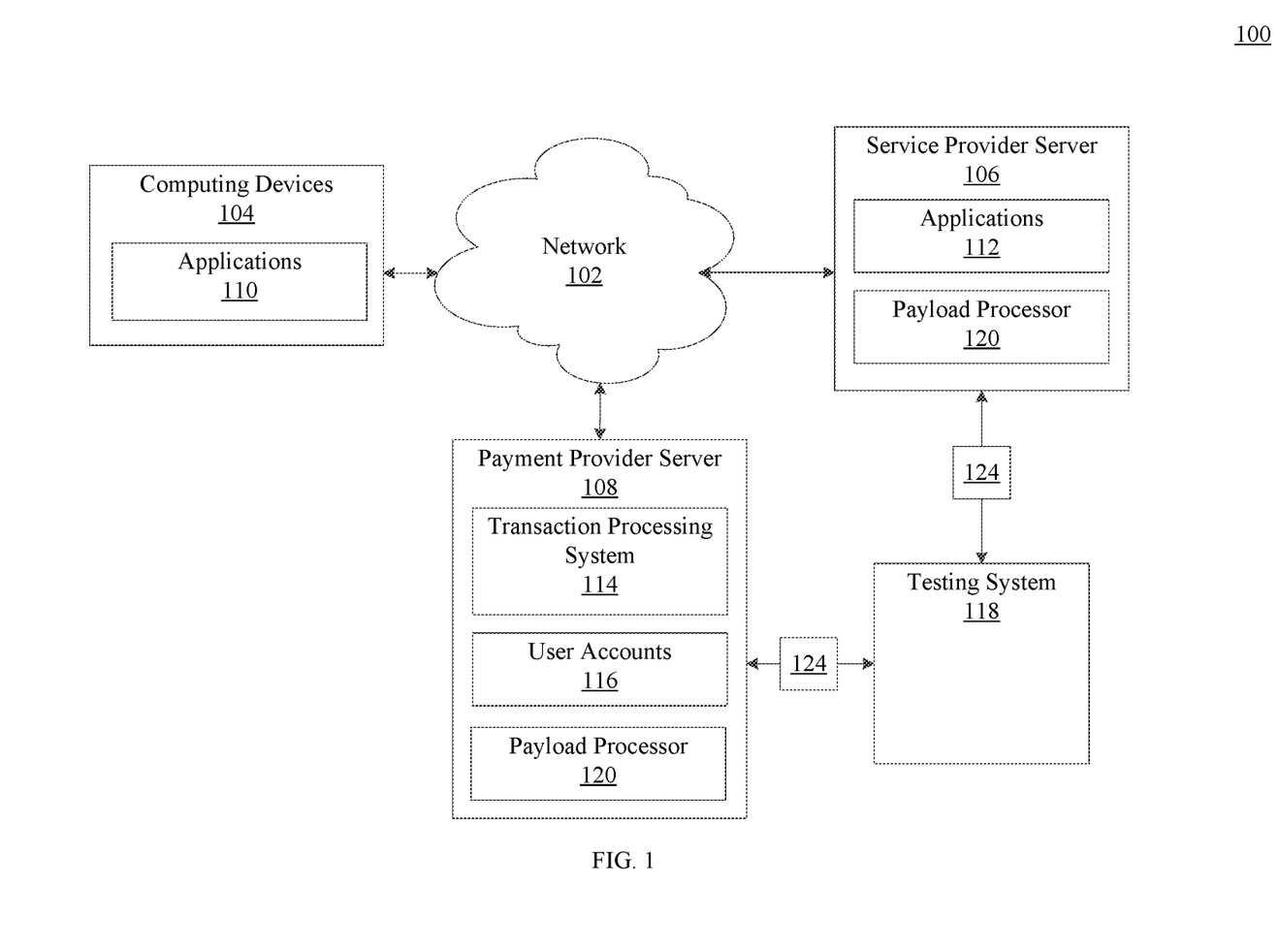
FIG. 1 is an exemplary system where embodiments can be implemented.

FIG. 1 is an exemplary system 100 where embodiments can be implemented. System 100 is a distributed computing system that includes a network 102. Network 102 may be implemented as a single network or a combination of multiple networks. For example, in various embodiments, network 102 may include the Internet or one or more intranets, landline networks, wireless networks, and/or other appropriate types of networks. Network 102 may be a small-scale communication network, such as a private or local area network, or a larger scale network, such as a wide area network.

Various components that are accessible to network 102 may be computing device(s) 104, service provider server(s) 106, and payment provider server(s) 108. Computing devices 104 may be portable and non-portable electronic devices under control of a user and configured to transmit, receive, and manipulate data from service provider server(s) 106 and payment provider server(s) 108 over network 102. Example computing devices 104 include desktop computers, laptop computers, tablets, smartphones, wearable computing devices, eyeglasses that incorporate computing devices, implantable computing devices, etc.

Computing devices 104 may include one or more applications 110. Applications 110 may be pre-installed on the computing devices 104, installed on the computing devices 104 using portable memory storage devices, such as compact disks or thumb-drives, or be downloaded to the computing devices 104 from service provider server(s) 106 and/or payment provider server(s) 108. Applications 110 may execute on computing devices 104 and receive instructions and data from a user, from service provider server(s) 106, and payment provider server(s) 108.

Example applications 110 may be payment transaction applications. Payment transaction applications may be configured to transfer money world-wide, receive payments for goods and services, manage money spending, etc. Further, applications 110 may be under an ownership or control of a payment service provider, such as PAYPAL®, Inc. of San Jose, CA, USA, a telephonic service provider, a social networking service provider, and/or other service providers. Applications 110 may also be analytics applications. Analytics applications perform business logic, provide services, and measure and improve performance of services and functions of other applications that execute on computing devices 104 based on current and historical data. Applications 110 may also be security applications for implementing client-side security features, programmatic client applications for interfacing with appropriate application programming interfaces (APIs) over network 102, communication applications, such as email, texting, voice, and instant messaging applications that allow a user to send and receive emails, calls, texts, and other notifications through network 102, and the like. Applications 110 may be location detection applications, such as a mapping, compass, and/or global positioning system (GPS) application, social networking applications and/or merchant applications. Additionally, applications 110 may be service applications that permit a user of computing device 104 to receive, request and/or view information for products and/or services, and also permit the user to purchase the selected products and/or services.

In an embodiment, applications 110 may utilize numerous components included in computing device 104 to receive input, store and display data, and communicate with network 102. Example components are discussed in detail in FIG. 4.

As discussed above, one or more service provider servers 106 may be connected to network 102. Service provider server 106 may also be maintained by a service provider, such as PAYPAL®, a telephonic service provider, social networking service, and/or other service providers. Service provider server 106 may be software that executes on a computing device configured for large scale processing and that provides functionality to other computer programs, such as applications 110 and applications 112 discussed below.

In an embodiment, service provider server 106 may initiate and direct execution of applications 112. Applications 112 may be counterparts to applications 110 executing on computing devices 104 and may process transactions at requests of applications 110. For example, applications 112 may be financial services applications configured to transfer money world-wide, receive payments for goods and services, manage money spending, etc., that receive messages from the financial services applications executing on computing device 104. Applications 112 may be security applications configured to implement client-side security features or programmatic client applications for interfacing with appropriate application programming interfaces (APIs) over network 102. Applications 112 may be communication applications that perform email, texting, voice, and instant messaging functions that allow a user to send and receive emails, calls, texts, and other notifications over network 102. In yet another embodiment, applications 112 may be location detection applications, such as a mapping, compass, and/or GPS applications. In yet another embodiment, applications 112 may also be incorporated into social networking applications and/or merchant applications.

In an embodiment, applications 110 and applications 112 may process transactions on behalf of a user. In some embodiments, process transactions applications 110, 112 may request payments for processing the transactions via payment provider server 108. For instance, payment provider server 108 may be a software application that is configured to receive requests from applications 110, 112 that cause the payment provider server 108 to transfer funds of a user using application 110 to a service provider associated with application 112. Thus, applications 110 and 112 may receive user data, including user authentication data, for processing any number of electronic transactions, such as through payment provider server 108.

In an embodiment, payment provider servers 108 may be maintained by a payment provider, such as PAYPAL®. Other payment provider servers 108 may be maintained by or include a merchant, financial services provider, credit card provider, bank, and/or other payment provider, which may provide user account services and/or payment services to a user. Although payment provider servers 108 are described as separate from service provider server 106, it is understood that one or more of payment provider servers 108 may include services offered by service provider server 106 and vice versa.

Each payment provider server 108 may include a transaction processing system 114. Transaction processing system 114 may correspond to processes, procedures, and/or applications executable by a hardware processor. In an embodiment, transaction processing system 114 may be configured to receive information from one or more applications 110 executing on computing devices 104 and/or applications 112 executing on service provider server 106 for processing and completion of financial transactions. Financial transactions may include financial information corresponding to user debit/credit card information, checking account information, a user account (e.g., payment account with a payment provider server 108), or other payment information. Transaction processing system 114 may complete the financial transaction for the purchase request by providing payment to application 112 executing on service provider server 106.

Payment provider server 108 may also include user accounts 116. Each user account 116 may be established by one or more users using applications 110 with payment provider server 108 to facilitate payment for goods and/or services offered by applications 112. User accounts 116 may include user information, such as name, address, birthdate, payment/funding information, travel information, additional user financial information, and/or other desired user data. In a further embodiment, user accounts 116 may be stored in a database or another memory storage described in detail in FIG. 4.

In an embodiment, the above described components in system 100 may be included in a production environment that may be used by multiple real-world users. To test the above components in system 100, system 100 may also include a testing server 118. Testing system 118 may be connected to payment provider server 108 and/or service provider server 106 in some embodiments or be a standalone system that may receive or otherwise obtain data from payment provider server 108 and/or service provider server 106. Testing system 118 may include new versions of software that, once tested, may be uploaded to execute within payment provider server 108 and/or service provider server 106 and may replace previous versions of the same software or be included as additional software.

Unlike a testing system where a developer or a tester identifies scenarios that include transactions or flows that may be tested by the testing system, system 100 may identify the real-world scenarios using a payload processor 120. Payload processor 120 may be incorporated into payment provider server 108, service provider server 106 or another server. Payload processor 120 may capture one or more payloads 124 generated by payment provider server 108, service provider server 106, or a combination thereof and/or other components in system 100. Each payload may include one or more transactions processed in system 100 and may include a host server (e.g. payment provider server 108 or service provider server 106) where transaction or flow originates, a payload type, one or more requests for a service, one or more responses for a service, and one or more decisions that occurred during the one or more transactions. Example decisions may be made by applications 110, payment provider server 108, service provider server 106, etc.

In an embodiment, payload processor 120 may capture one or more payloads 124 in real time or when payloads 124 are generated by payment provider server 108, service provider server 106, etc. Further, payload processor 120 may execute daily or periodically (such as during time periods when system 100 may have high payload 124 throughput) in order to continuously capture payloads 124 and continuously learn new payload patterns and identify unique payloads, as will be discussed below.

Figure 2:
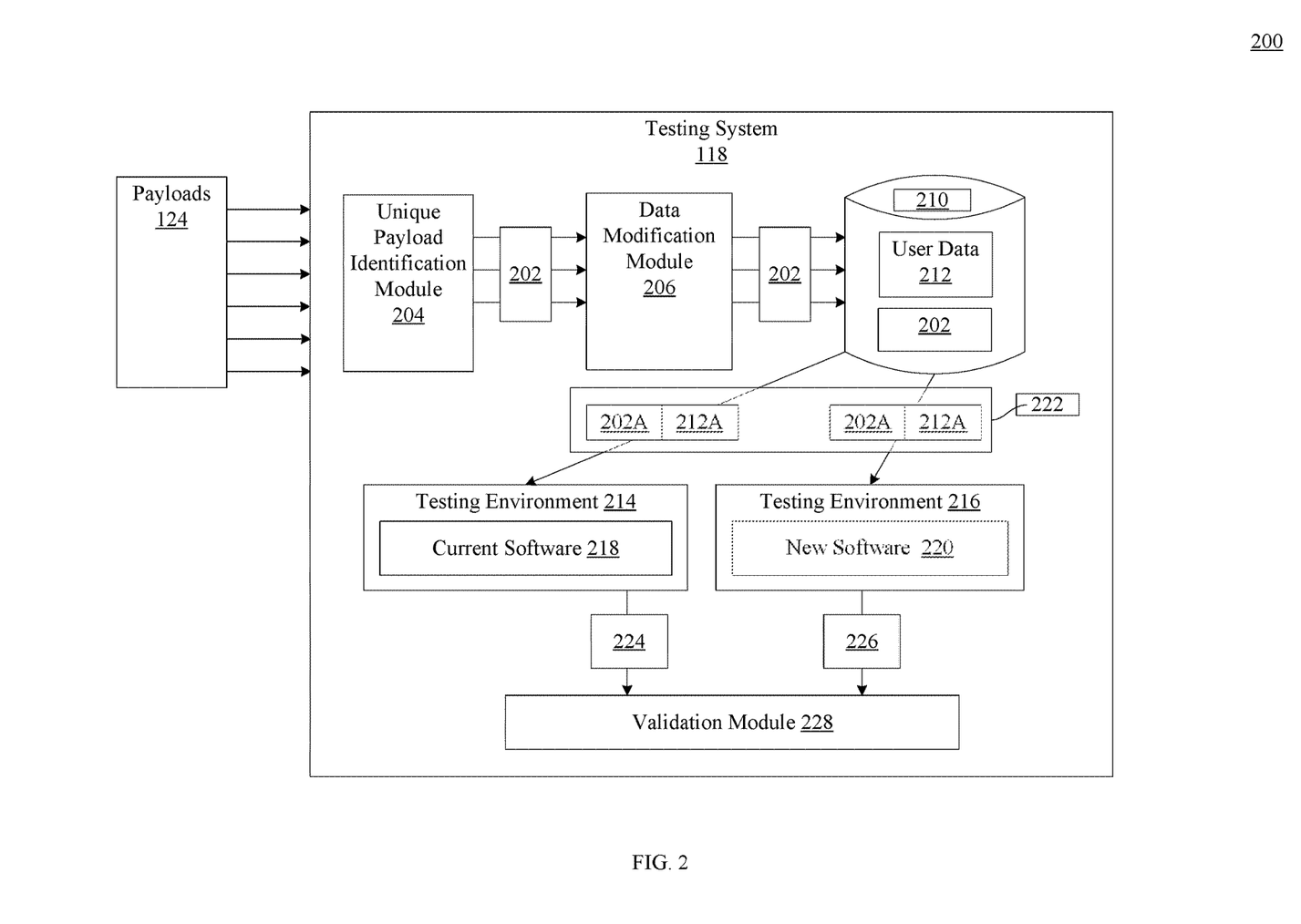
FIG. 2 is a block diagram of a testing system, according to an embodiment

In an embodiment, once payload processor 120 identifies one or more payloads 124, payload processor 120 may transmit payloads 124 to testing system 118. FIG. 2 is a block diagram of a testing system, according to an embodiment. Although illustrated as a single component, testing system 118 may be included in multiple components.

As illustrated in FIG. 2, testing system 118 may receive payloads 124 from payload processor 120 (not shown). Because payload processor 120 may continuously receive transactions from payment provider server 108 and/or service provider server 106 which continuously receive transactions from various computing devices 104, payload processor 120 may generate millions of payloads 124 each hour and transmit these payloads 124 to testing system 118. To reduce the volume of payloads 124 that payload processor 120 receives, while identifying unique payloads 202 to test scenarios that exists in the production environment, testing system 118 may include a unique payload identification module 204. Unique payload identification module 204 may be a software module that executes using and is stored within one or more components discussed in FIG. 4.

In an embodiment, to identify unique payloads 202, unique payload identification module 204 may be configured to continuously identify unique payloads 202 received by payload processor 120 using one or more attributes from payloads 124. Example attributes may include certain user information, instrument or instrument type that maybe used to process a transaction, country where the transaction originates, state where the transaction originates, transaction type, phone number, etc. The one or more attributes may be configured using a user interface or a configuration file (not shown). Once unique payload identification module 204 receives the one or more attributes, unique payload identification module 204 may use an algorithm, such as a map-reduce algorithm to identify unique payloads 202 from payloads 124 that include the unique one or more attributes. For example, suppose the one or more attributes are transaction type, a type of a payment instrument (such as a credit card, debit card, etc.) and a country code stored in payload 124 that includes a payment transaction. Using these attributes and the map component of a map reduce algorithm (or another algorithm), unique payload identification module 204 may generate a hash for each payload 124. Using the generated hashes and the reduce component of the map reduce algorithm (or another algorithm), unique payload identification module 204 may group payloads 124 with the same hashes into payload sets or hash sets. Once grouped, unique payload identification module 204 may select one payload 124 from each payload set or one payload 124 that corresponds to each hash set as the unique payload 202. In this way, the millions of payloads 124 that testing system 118 receives may be condensed to thousands (or less) unique payloads 202, and without losing different scenarios that exist in the production environment.

In some embodiments, payloads 202 may pass through a data modification module 206. Data modification module 206 may be a software module that executes using and is stored within one or more components discussed in FIG. 4. Data modification module 206 may modify or remove data from one or more attributes in payloads 202. For example, because payloads 202 include data from a production environment, payloads 202 may include user data, financial instrument data, confidential data, etc. Data modification module 206 may remove or modify this type of data from payloads 202.

In an embodiment, testing system 118 may also include a memory storage 210. Memory storage 210 may be a memory conducive for large scale storage, such as a database or another type of memory discussed in FIG. 4. In an embodiment, memory storage 210 may store payloads 202 that were modified using data modification module 206. In another embodiment, memory storage 210 may store user data 212. User data 212 may include user data from user accounts 116, applications 110, and/or applications 112. User data 212 may also include user profiles that may be created for testing new and existing software in testing system 118. Unlike the user data in system 100, user data 212 does not include user data that is associated with real world users and other credentials. In some embodiments, user data may be specific to one or more payloads 202 and may be used to test the new software using one or more payloads 202. In an embodiment, testing system 118 may generate user data 212 that emulates user data in production for payload 202. In some embodiments, user data may be stored in database tables or in one or more configuration files in memory storage 210.

In an embodiment, testing system 118 may have a testing environment 214 and a testing environment 216. Testing environment 214 may simulate a production environment discussed in FIG. 1 and have software components included in production environment. In an embodiment, testing environment 214 may also include current software 218. Current software 218 may be one or more of applications 110, applications 112, transaction processing system 114, or other components that system 100 may use to process transactions and may be software that may be tested using testing environment 214. Testing environment 216 may include software components that are in production environment. Additionally, testing environment may include new software 220 that may be a new or upgraded version of one or more of the production environment software components, such as applications 110, applications 112, transaction processing system 114, or other components that system 100.

To test new software 220, testing system 118 may use testing environment 214 and testing environment 216. For example, testing system 118 may upload all or a portion of payloads 202, referred to as payload 202A, and some or all user data 212 from memory storage 210, referred to as user data 212A into testing environment 214 and testing environment 216. In some embodiments, user data 212A may be a portion of user data 212 that may be associated with payloads 202A.

In some embodiments, payload 202A and user data 212A may be stored in a temporary memory cache, such as memory cache 222. Memory cache 222 may be accessible to testing environment 214 and testing environment 216 and is one of memories discussed in FIG. 4.

In an embodiment, testing environment 214 may test current software 218 using payload 202A and user data 212A and generate expected results 224. Expected results 224 may include data in a form of one or more attributes that may be an output of a scenario. Example attributes may include an instrument, a transaction type, user data, country code, etc. Similarly, testing environment 216 may test new software 220 using payload 202A and user data 212A to generate actual results 226. Actual results 226 may include data in a form of one or more attributes that may be an output of a scenario. Example attributes may include an instrument, a transaction type, user data, country code, etc. Actual results 226 may have the same, partially the same, or different data in the one or more attributes from expected results 224.

In an embodiment, testing system 118 may include a validation module 228. Validation module 228 may determine whether new software 220 generates an error that may affect production environment discussed in FIG. 1. To determine whether new software 220 may generate an error, validation module 228 may be configured to compare expected results 224 to actual results 226. In one embodiment, validation module 228 may be configured to determine whether the data in one or more attributes of expected results 224 matches the data in one or more attributes of actual results 226. In another embodiment, validation module 228 may determine whether there was an expected change in data in the one or more attributes in actual results 226. For example, a payment instrument attribute in expected results 224 may be compared to a payment instrument attribute in actual results 226 to determine if there is a match. In another example, a country code attribute in expected results 224 may be compared to a country code attribute in actual results 226 to also determine if there is a match. The match may indicate that new software 220 does not generate an error. In an embodiment, validation module 228 may determine a match between multiple attributes in expected results 224 and expected results 226 to determine that new software does not generate an error.

In an embodiment, validation module 228 may be configured with one or more rules for comparing the one or more attributes in expected results 224 with the one or more attributes in actual results 226. For example, validation module 228 may be configured to identify which attributes in expected results 224 to compare with which attributes in actual results 226, changes in which attributes in actual results 226 to ignore, and which attributes may be expected to change in actual results 226 in a way that is different from the attributes in expected results 224.

In an embodiment, validation module 228 may include a user interface (not shown). The user interface may be used to configure which attributes in expected results 224 and actual results 226 may be compared or viewed. The user interface may also be used to determine which payload 202A and user data 202A may be used by testing environment 214 and testing environment 216 to obtain expected results 224 and actual results 226.

Figure 3:
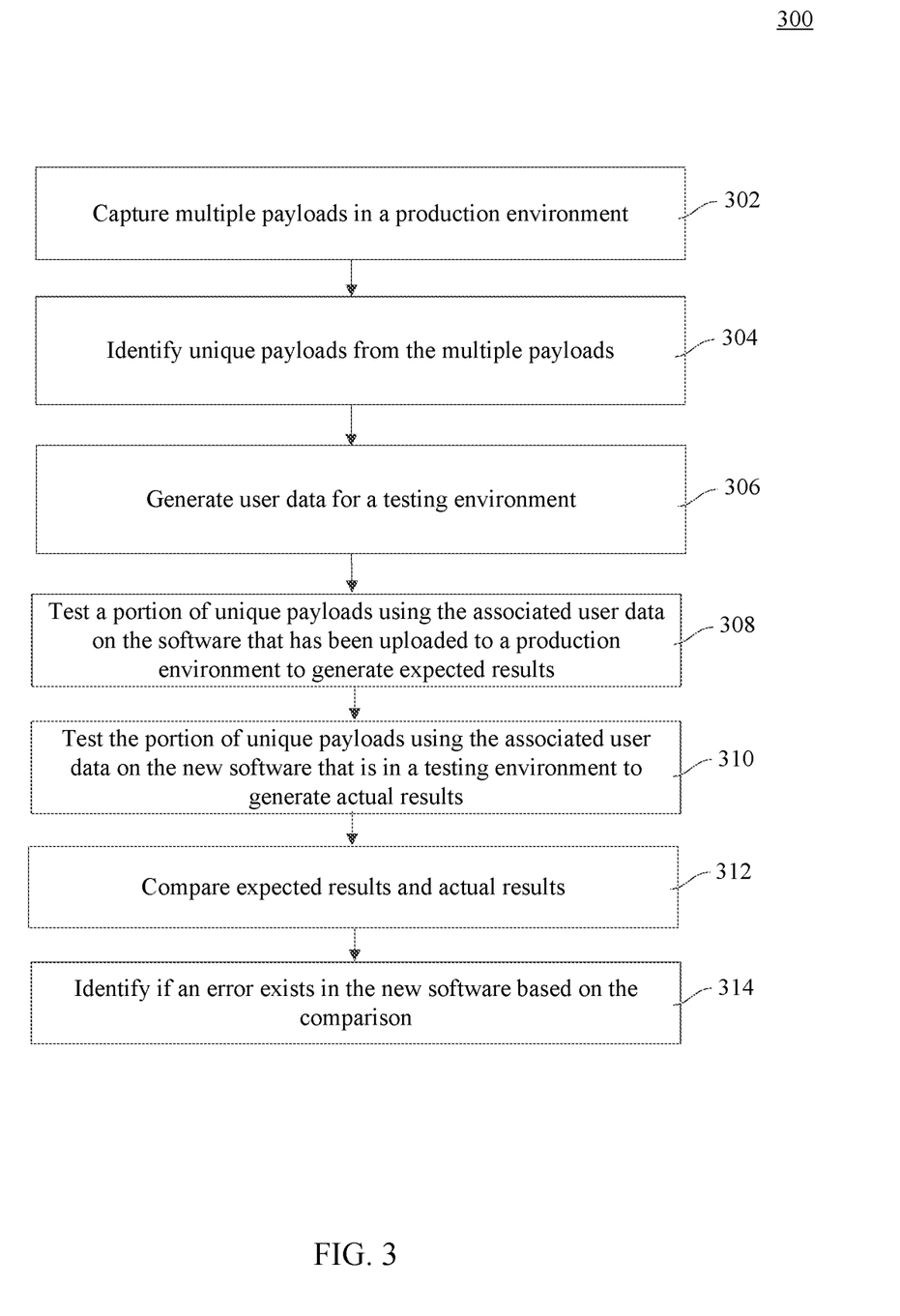
FIG. 3 is a flowchart of a method for validating new software, according to an embodiment.

FIG. 3 is a flowchart of a method 300 for validating new software, according to an embodiment. Method 300 may be performed using hardware and/or software components described in FIGS. 1-2. Note that one or more of the operations may be deleted, combined, or performed in a different order as appropriate.

At operation 302, multiple payloads in a production environment are captured. For example, payload processor 120 may continuously capture scenarios that occur in one or more applications 110, applications 112, payment provider server 108 and/or service provider server 106 that are in a production environment of system 100 and identify payloads 124 from the scenarios.

At operation 304, unique payloads are identified. For example, testing system 118 may identify unique payloads 202 from payloads 124. As discussed above, unique payload identification module 204 may continuously identify unique payloads 202 from payloads 124 by determining a hash of one or more attributes of each payload 124 and aggregating payloads 124 with the same hashes into payload sets or hash sets. One of payloads 124 from each payload set may be unique payload 202, or one of payloads 124 that is associated with each hash set may be unique payload 202.

At operation 306, user data is generated. For example, testing system 118 may generate and store user data 212 in memory storage 210 that may be used to test new software 220. As discussed above, user data 212 may be associated with unique payloads 202.

At operation 308, expected results are generated by testing unique payloads in a testing environment that simulates production environment. For example, testing environment 214 may generate expected results 224 by testing current software 218, which is the same software as in the production environment of system 100, using user data 212A and unique payloads 202A. As discussed above, unique payloads 202A may be the scenarios that exist in production environment but that are performed on user data 212A that is not associated with real users or financial instruments of the production environment. As further discussed above, payloads 202A and user data 212A may be respective portions of payloads 202 and user data 212 that may be used to obtain expected results 224 for current software 218.

At operation 310, actual results are generated by testing unique payloads in a testing environment that includes new software. For example, testing environment 216 may generate actual results 226 by testing new software 220 (which may be a new version of existing software or software that is new to production environment in FIG. 1) using user data 212A and unique payloads 202A.

At operation 312, expected results and actual results are compared. For example, validation module 228 may compare expected results 224 with actual results 226 by comparing the one or more attributes of expected results 224 to the one or more attributes in actual results 226. In another example, validation module 228 may compare expected results 224 with actual results 226 by determining changes in the one or more attributes in actual results 226 that are different from expected results 224.

At operation 314, an existence of an error is identified. For example, validation module 228 may identify an error in new software 220 based on a mismatch between the one or more attributes in expected results 224 and actual results 226. In another example, validation module 228 may identify an error in new software 220 based on a change (or a lack of change) in the one or more attributes in actual results 226 as compared to expected results 224.

Figure 4:
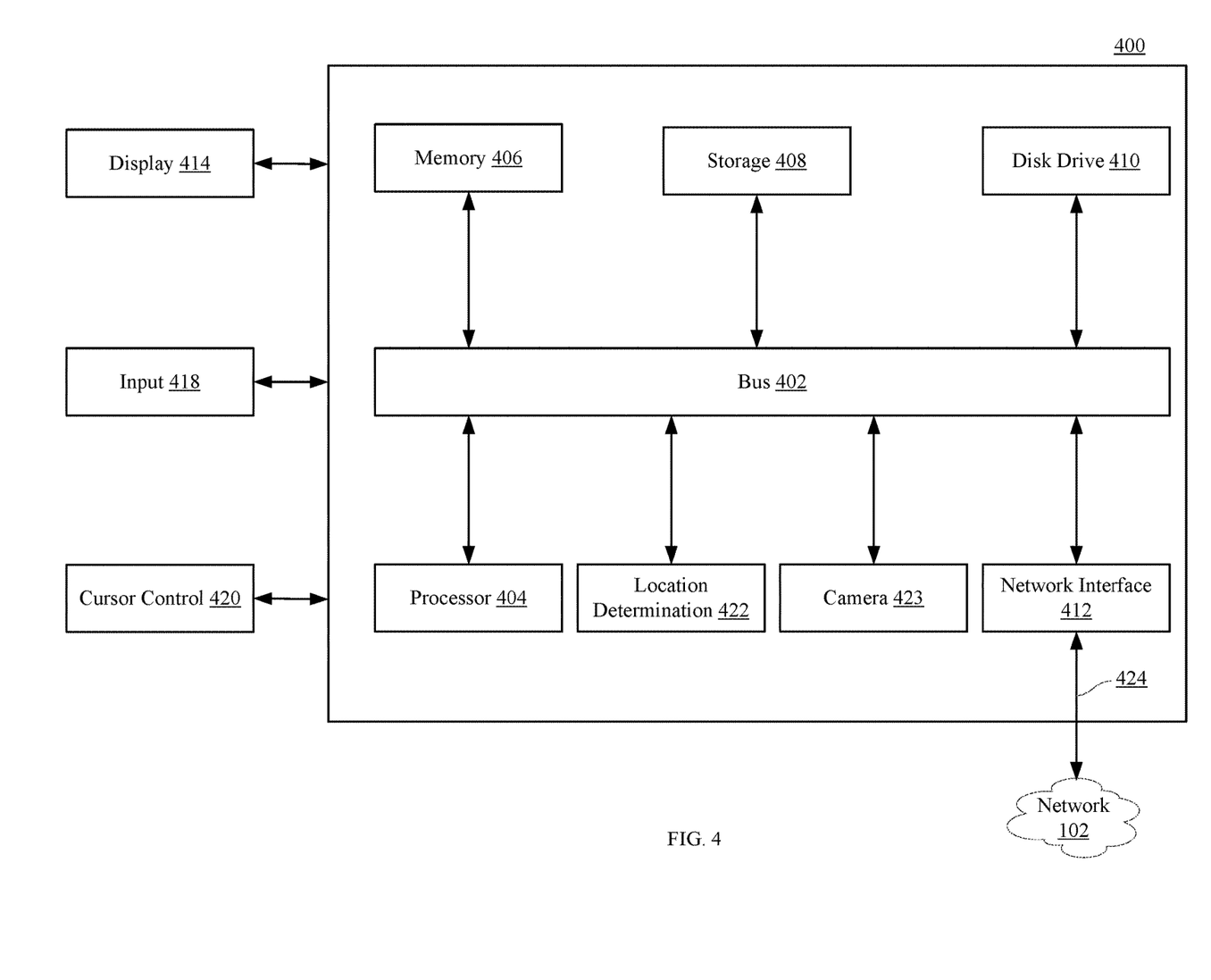
FIG. 4 is a block diagram of a computer system suitable for implementing one or more components or operations in FIGS. 1-3 according to an embodiment.

Referring now to FIG. 4 an embodiment of a computer system 400 suitable for implementing, the systems and methods described in FIGS. 1-3 is illustrated.

In accordance with various embodiments of the disclosure, computer system 400, such as a computer and/or a server, includes a bus 402 or other communication mechanism for communicating information, which interconnects subsystems and components, such as a processing component 404 (e.g., processor, micro-controller, digital signal processor (DSP), graphics processing unit (GPU), etc.), a system memory component 406 (e.g., RAM), a static storage component 408 (e.g., ROM), a disk drive component 410 (e.g., magnetic or optical), a network interface component 412 (e.g., modem or Ethernet card), a display component 414 (e.g., CRT or LCD), an input component 418 (e.g., keyboard, keypad, or virtual keyboard), a cursor control component 420 (e.g., mouse, pointer, or trackball), a location determination component 422 (e.g., a Global Positioning System (GPS) device as illustrated, a cell tower triangulation device, and/or a variety of other location determination devices known in the art), and/or a camera component 423. In one implementation, the disk drive component 410 may comprise a database having one or more disk drive components.

In accordance with embodiments of the disclosure, the computer system 400 performs specific operations by the processor 404 executing one or more sequences of instructions contained in the memory component 406, such as described herein with respect to the mobile communications devices, mobile devices, and/or servers. Such instructions may be read into the system memory component 406 from another computer readable medium, such as the static storage component 408 or the disk drive component 410. In other embodiments, hard-wired circuitry may be used in place of or in combination with software instructions to implement the disclosure.

Logic may be encoded in a computer readable medium, which may refer to any medium that participates in providing instructions to the processor 404 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 410, volatile media includes dynamic memory, such as the system memory component 406, and transmission media includes coaxial cables, copper wire, and fiber optics, including wires that comprise the bus 402. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the disclosure, execution of instruction sequences to practice the disclosure may be performed by the computer system 400. In various other embodiments of the disclosure, a plurality of the computer systems 400 coupled by a communication link 424 to the network 102 (e.g., such as a LAN, WLAN, PTSN, and/or various other wired or wireless networks, including telecommunications, mobile, and cellular phone networks) may perform instruction sequences to practice the disclosure in coordination with one another.

The computer system 400 may transmit and receive messages, data, information and instructions, including one or more programs (i.e., application code) through the communication link 424 and the network interface component 412. The network interface component 412 may include an antenna, either separate or integrated, to enable transmission and reception via the communication link 424. Received program code may be executed by processor 404 as received and/or stored in disk drive component 410 or some other non-volatile storage component for execution.

Where applicable, various embodiments provided by the disclosure may be implemented using hardware, software, or combinations of hardware and software. Also, where applicable, the various hardware components and/or software components set forth herein may be combined into composite components comprising software, hardware, and/or both without departing from the scope of the disclosure. Where applicable, the various hardware components and/or software components set forth herein may be separated into sub-components comprising software, hardware, or both without departing from the scope of the disclosure. In addition, where applicable, it is contemplated that software components may be implemented as hardware components and vice-versa.

Software, in accordance with the disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the disclosure to the precise forms or particular fields of use disclosed. As such, it is contemplated that various alternate embodiments and/or modifications to the disclosure, whether explicitly described or implied herein, are possible in light of the disclosure. Having thus described embodiments of the disclosure, persons of ordinary skill in the art will recognize that changes may be made in form and detail without departing from the scope of the disclosure. Thus, the disclosure is limited only by the claims.

What is claimed is:

1. A method comprising:
   identifying a plurality of payloads that correspond to scenarios in a production computing environment;
   determining hashes for the plurality of payloads by:
      identifying a subset of attributes in a plurality of attributes in each payload in the plurality of payloads, wherein the subset of attributes include data from the scenarios in the production computing environment; and
      determining a hash of the identified subset of attributes in the each payload;
   aggregating payloads in the plurality of payloads that have a same first hash in the hashes into a first set of payloads;
   aggregating payloads in the plurality of payloads that have a same second hash in the hashes into a second set of payloads;
   selecting a first payload from the first set of payloads aggregated according to the first hash and a second payload from the second set of payloads aggregated according to the second hash into a set of unique payloads, wherein the first payload includes first values of the subset of attributes and the second payload includes second values of the subset of attributes different from the first values;
   creating user data, wherein the user data is associated with the set of unique payloads;
   testing the set of unique payloads with the user data in a first testing environment to generate expected results, wherein the first testing environment includes software components in the production computing environment;
   testing the set of unique payloads with the user data in a second testing environment to generate actual results, wherein the second testing environment includes the software components in the production computing environment and new software;
   comparing the expected results with the actual results; and
   identifying an error in the new software based on the comparing.

2. The method of claim 1, wherein aggregating the payloads into the first set of payloads further comprises:
   aggregating the payloads that have the same first hash and a same third hash in the hashes into the first set of payloads.

3. The method of claim 1, wherein determining the hashes further comprises:
   determining the same first hash in the hashes using the subset of attributes associated with the first payload; and
   determining the same second hash in the hashes using the subset of attributes associated with the second payload, wherein the subset of attributes are same types of attributes in the plurality of payloads that have different values in the first payload and the second payload.

4. The method of claim 1, further comprising:
   removing a first type of data from the set of unique payloads, wherein the first type of data includes at least user information.

5. The method of claim 1, further comprising:
   storing the user data in a memory cache accessible to the first testing environment and the second testing environment.

6. The method of claim 1, wherein the comparing further comprises:
   configuring at least one attribute in the expected results generated by the first testing environment and the actual results generated by the second testing environment; and
   comparing a value of the at least one attribute in the expected results to a value of the at least one attribute in the actual results.

7. The method of claim 6, further comprising:
   determining that the value in the expected results is different from the value in the actual results; and
   identifying the error in the second testing environment based on the determining.

8. The method of claim 1, wherein the comparing further comprises:
   configuring a first attribute in the expected results generated by the first testing environment and a second attribute in the actual results generated by the second testing environment;
   comparing a first value of the first attribute in the expected results to a first value of the second attribute in the actual results;
   comparing a second value of the first attribute in the expected results to a second value of the second attribute in the actual results; and
   determining the error when the first value of the first attribute in the expected results matches the first value of the second attribute in the actual results and the second value of the first attribute in the expected results does not match the second value of the second attribute in the actual results.

9. The method of claim 1, wherein creating the user data further comprises:
   identifying a payload in the plurality of payloads;

identifying user production data that is associated with the payload; and creating the user data that emulates the user production data.

10. A system comprising:

a non-transitory memory storing instructions; and one or more hardware processors coupled to the non-transitory memory and configured to read the instructions from the non-transitory memory to cause the system to perform operations comprising:

identifying a plurality of payloads that correspond to scenarios in a production computing environment, wherein each payload includes a request and a response for a transaction that passes through a distribute computing system;

determining hashes for the plurality of payloads by:
identifying multiple attributes in a plurality of attributes in each payload in the plurality of payloads, wherein the multiple attributes include data from the transaction; and
determining a hash of the identified multiple attributes in the each payload;

aggregating payloads in the plurality of payloads that have a same first hash in the hashes into a first set of payloads;

aggregating payloads in the plurality of payloads that have a same second hash in the hashes into a second set of payloads;

selecting a first payload from the first set of payloads aggregated according to the first hash and a second payload from the second set of payloads aggregated according to the second hash into a set of unique payloads, wherein the first payload includes values of the multiple attributes different from values of the multiple attributes in the second payload;

creating user data, wherein the user data is associated with the set of unique payloads;

testing the set of unique payloads with the user data in a first testing environment to generate expected results, wherein the first testing environment includes software components in the production computing environment;

testing the set of unique payloads with the user data in a second testing environment to generate actual results, wherein the second testing environment includes the software components in the production computing environment and new software;

comparing the expected results with the actual results; and identifying an error in the new software based on the comparing.

11. The system of claim 10, wherein the operations further comprise:

aggregating payloads that have the same first hash and a same third hash in the hashes into the first set of payloads.

12. The system of claim 11, wherein the operations that determine the hashes further comprise:

determining the same first hash in the hashes using the multiple attributes associated with the first payload; and determining the same second hash in the hashes using the multiple attributes associated with the second payload, wherein the multiple attributes are same types of attributes in the plurality of payloads and have different values in the first hash and the second hash.

13. The system of claim 10, wherein the operations further comprise:

removing a first type of data from the set of unique payloads, wherein the first type of data includes at least user information.

14. The system of claim 10, wherein the operations further comprise:

storing the user data in a memory cache accessible to the first testing environment and the second testing environment.

15. The system of claim 10, wherein the operations further comprise:

configuring at least one attribute in the expected results generated by the first testing environment and the actual results generated by the second testing environment; and comparing a value of the at least one attribute in the expected results to a value of the at least one attribute in the actual results.

16. The system of claim 15, wherein the operations further comprise:

determining that the value in the expected results is different from the value in the actual results; and identifying the error in the second testing environment based on the determining.

17. The system of claim 10, wherein the operations that compare further comprise:

configuring a first attribute in the expected results generated by the first testing environment and a second attribute in the actual results generated by the second testing environment;

comparing a first value of the first attribute in the expected results to a first value of the second attribute in the actual results;

comparing a second value of the first attribute in the expected results to a second value of the second attribute in the actual results; and determining the error when the first value of the first attribute in the expected results matches the first value of the second attribute in the actual results and the second value of the first attribute in the expected result actual results does not match the second value of the second attribute in the actual results.

18. The system of claim 10, wherein the operations that create the user data further comprise:

identifying a payload in the plurality of payloads;

identifying user production data that is associated with the payload; and creating user data that emulates the user production data.

19. A non-transitory machine-readable medium having stored thereon machine-readable instructions executable to cause a machine to perform operations comprising:

identifying a plurality of payloads that correspond to scenarios in a production computing environment;

determining hashes for the plurality of payloads by:
identifying a subset of attributes in each payload in the plurality of payloads, wherein the subset of attributes include data from the production computing environment; and
determining a hash of the identified subset of attributes in the each payload;

aggregating payloads in the plurality of payloads that have a same first hash in the hashes into a first set of payloads;

aggregating payloads in the plurality of payloads that have a same second hash in the hashes into a second set of payloads;

selecting a first payload from the first set of payloads aggregated according to the first hash and a second payload from the second set of payloads aggregated according to the second hash into a set of unique payloads, wherein the first payload includes values of the subset of attributes different from values of the subset of attributes included in the second payload;

creating user data, wherein the user data is associated with the set of unique payloads;

testing the set of unique payloads with the user data in a first testing environment to generate expected results, wherein the first testing environment includes software components in the production computing environment;

testing the set of unique payloads with the user data in a second testing environment to generate actual results, wherein the second testing environment includes the software components in the production computing environment and new software that modifies at least one software component in the software components in the production environment;

comparing the expected results with the actual results; and identifying an error in the new software based on the comparing.

20. The non-transitory machine-readable medium of claim 19, wherein the operations further comprise:

aggregating payloads that have the same first hash and a same third hash in the hashes into the first set of payloads.

* * * * *

UNITED STATES PATENT AND TRADEMARK OFFICE
CERTIFICATE OF CORRECTION

| | |
|---|---|
| PATENT NO. | : 12,001,318 B2 |
| APPLICATION NO. | : 16/237108 |
| DATED | : June 4, 2024 |
| INVENTOR(S) | : Prasanth Kuricheti et al. |

It is certified that error appears in the above-identified patent and that said Letters Patent is hereby corrected as shown below:

In the Claims

In Claim 17, Column 14, Lines 39-41, change "the first attribute in the expected result actual results does not match the second value of the second attribute in the actual results." to --the first attribute in the expected result does not match the second value of the second attribute in the actual results.--

Signed and Sealed this
Seventeenth Day of September, 2024

Katherine Kelly Vidal
*Director of the United States Patent and Trademark Office*